United States Patent
Damnjanovic et al.

(10) Patent No.: US 8,693,362 B2
(45) Date of Patent: Apr. 8, 2014

(54) POWER HEADROOM REPORTING

(75) Inventors: Aleksandar Damnjanovic, Del Mar, CA (US); Jelena M. Damnjanovic, Del Mar, CA (US); Juan Montojo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 322 days.

(21) Appl. No.: 13/079,724

(22) Filed: Apr. 4, 2011

(65) Prior Publication Data

US 2012/0082041 A1    Apr. 5, 2012

Related U.S. Application Data

(60) Provisional application No. 61/321,074, filed on Apr. 5, 2010.

(51) Int. Cl.
*H04L 1/00* (2006.01)

(52) U.S. Cl.
USPC ........... 370/252; 709/223; 709/224; 709/225; 709/226

(58) Field of Classification Search
USPC .................. 370/240, 252, 310–350
See application file for complete search history.

(56) References Cited

U.S. PATENT DOCUMENTS

2011/0038271 A1*  2/2011  Shin et al. .................... 370/252

FOREIGN PATENT DOCUMENTS

WO    WO9966744 A1    12/1999

OTHER PUBLICATIONS

Nokia Siemans Networks, Uplink Power Control for LTE-Advanced, (IDS filed Oct. 10, 2012, NPL #4), Jan. 2010.*
CATT: "Considerations on uplink power control in LTE-Advanced", 3GPP Draft; R1-100071, 3rd Generation Partnership Project (3GPP), Mobile Competence Centre ; 650, Route des Lucioles ; F-06921 Sophia-Antipolis Cedex ; France, vol. RAN WGI, No. Valencia, Spain; 20100118, Jan. 12, 2010, XP050417814, [retrieved on Jan. 12, 2010].
International Search Report and Written Opinion—PCT/US2011/031306-ISA/EPO—Jul. 28, 2011 (101553WO).
Nokia Siemens Networks et al: "Uplink Power Control for LTE-Advanced"3GPP Draft; R1-100322, 3rd Generation Partnership Project (3GPP ), Mobile Route Competence Centre ; 650, Route des Lucioles ; F-06921 Sophia-Antipolis Cedex ; France,vol. RAN WG1, No. Valencia, Spain;20100118, Jan. 12, 2010,XP050417990,[retrieved on 2010-01-123 the whole document.

(Continued)

*Primary Examiner* — Bob Phunkulh
(74) *Attorney, Agent, or Firm* — Steven A. Raney

(57) ABSTRACT

Systems, methods, apparatuses, and computer program products are described for power headroom reporting. A mobile device may identify a transmit power associated with each of a number of independently power controlled channels on one or multiple carriers configured for use by the mobile device. The transmit power may relate to one channel that is an uplink control channel, and one or more additional channels that are uplink shared channels. The identified transmit power of one channel (e.g., the uplink control channel) may be a virtual transmit power, while other identified transmit powers may be measured transmit powers for actual transmissions. The identified transmit powers may be added up, and the power headroom available for the mobile device may be calculated using the accumulated transmit powers. The mobile device may transmit a power headroom report to a base station.

40 Claims, 10 Drawing Sheets

(56) References Cited

OTHER PUBLICATIONS

Potevio: "Uplink Power Control for Carrier Aggregation in LTE-Advanced" 3GPP Draft; R1-100609, 3rd Gene Ratio Partnership Project (3GPP), Mobile Competence Centre ; 650;Route des Lucioles ; F-06921 Sophia-Antipolis Cedex ; France, vol. RAN WG1, No. Valencia, Spain; 20100118, Jan. 12, 2010, XP050418215, [retrieved on Jan. 12, 2010] the whole document, Publication Date: Jan. 12, 2010.

Competence Centre; 650; Route des Lucioles; F-0621 Sophia-Antipolis Cedex; France, vol. RAN WG1, no. Val enci a, Spain; 2010018, Jan. 12, 2010, XP050418215, [retrieved on Jan. 12, 2010] the whole document. Publication Date: Jan. 12, 2010.

Samsung: "PCMAX and PH determination for type 2 PHR", 3GPP Draft; R2-106510 PCMAX Determination, 3rd Generation Partnership Project (3GPP), Mobile Competence Centre; 650, Route des Lucioles; F-06921 Sophia-Antipolis Cedex; France, vol. RAN WG2, no. Jacksonville, USA; 20101115, Nov. 9, 2010, XP050492308, [retrieved on Nov. 9, 2010].

ZTE: "Discussion on PHR MAC CE design", 3GPP Draft; R2-106684 Discussion on PHR MAC CE Design, 3rd Generation Partnership Project (3GPP), Mobile Competence Centre; 650, Route des Lucioles; F-06921 Sophia-Antipolis Cedex; France, vol. RAN WG2, no. Jacksonville, USA; 20101115, Nov. 17, 2010, XP050492419, [retrieved on Nov. 17, 2010].

* cited by examiner

US 8,693,362 B2

POWER HEADROOM REPORTING

CROSS REFERENCES

This patent application claims priority benefit of U.S. provisional patent application Ser. No. 61/321,074, entitled "APPARATUS AND METHOD FOR POWER HEADROOM REPORTING FOR PUSCH AND PUCCH", filed Apr. 5, 2010, the disclosure of which is incorporated herein in its entirety.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output (SISO), multiple-input single-output (MISO) or a multiple-input multiple-output (MIMO) system. To reduce interference and improve efficiency, terminals may be power controlled by base stations subject to a maximum power limit.

SUMMARY

The following generally relates to systems, methods, devices, and computer program products for power headroom reporting. Further scope of the applicability will become apparent from the following detailed description, claims, and drawings. The detailed description and specific examples are given by way of illustration only, since various changes and modifications within the spirit and scope of the description will become apparent to those skilled in the art.

In one example, novel functionality is described for transmitting a PHR from a mobile device. The mobile device may identify a transmit power associated with each of a number of independently power controlled channels on one or more configured carriers. There may be a one channel that is an uplink control channel, and one or more additional channels that are uplink shared channels. The identified transmit power of one channel (e.g., the uplink control channel) may be a virtual transmit power, while other identified transmit powers may be measured transmit powers for actual transmissions. The identified transmit powers may be accumulated, and the power headroom available for the mobile device may be calculated using the accumulated transmit powers. The mobile device may transmit a power headroom report to a base station.

In one example, a method of reporting power headroom from a mobile device may comprise: identifying a transmit power associated with each of a plurality of independently power controlled channels on which the mobile device is configured to transmit concurrently; accumulating the identified transmit powers; calculating a power headroom available for the mobile device using the accumulated transmit powers; and transmitting a headroom report comprising the calculated power headroom available for the mobile device.

A first channel may be an uplink control channel and a second channel may be an uplink shared channel. The identified transmit power of the first channel may be a virtual transmit power, and the identified transmit power of the second channel may be a determined transmit power for an actual transmission. The first channel may be a physical uplink control channel (PUCCH); the second channel may be a physical uplink shared channel (PUSCH); and the PUCCH and PUSCH may be transmitted concurrently on different carriers. The identified transmit power of one or more of the plurality of independently power controlled channels may be virtual transmit power. The virtual transmit power may be determined by disregarding a variation associated with uplink control channel transmission in calculating the power headroom.

To identify transmit powers, a transmit power may be determined during a first time period for a first independently power controlled channel to identify a first transmit power; and a virtual transmit power may be attributed to a second independently power controlled channel to identify a second transmit power, wherein the mobile device does not transmit on the second independently power controlled channel during the first time period. Each of the plurality of independently power controlled channels may be transmitted on a different carrier of a multi-carrier system. The plurality of independently power controlled channels may be allocated to a single carrier.

In another example, a device for reporting power headroom may comprise: a measurement module configured to identify a transmit power associated with each of a plurality of independently power controlled channels on which a mobile device is configured to transmit concurrently; a power headroom calculation module configured to sum the identified transmit powers, and calculate a power headroom available for the mobile device using the summed transmit powers; and a transmitter configured to transmit a headroom report comprising the calculated power headroom available for the mobile device.

For the device, first channel may be an uplink control channel and a second channel may be an uplink shared channel. The identified transmit power of the first channel may be a virtual transmit power, and the identified transmit power of the second channel may be a determined transmit power for an actual transmission. The first channel may be a physical uplink control channel (PUCCH); the second channel may be a physical uplink shared channel (PUSCH); and the PUCCH and PUSCH may be transmitted concurrently on different carriers. The identified transmit power of one or more of the plurality of independently power controlled channels may be virtual transmit power. The power headroom calculation module of the device may be further configured to determine the virtual transmit power by disregarding a variation associated with uplink control channel transmission in calculating the power headroom.

To identify a transmit power associated with each of a plurality of independently power controlled channels, the measurement module of the device may be configured to determine transmit power during a first time period for a first independently power controlled channel to identify a first transmit power; and attribute a virtual transmit power to a second independently power controlled channel to identify a second transmit power, wherein the mobile device does not transmit on the second independently power controlled channel during the first time period.

Each of the plurality of independently power controlled channels of the device may be transmitted on a different uplink carrier of a multi-carrier system. The plurality of independently power controlled channels of the device may be allocated to a single uplink carrier. The device may be a processor. The device may a mobile device. The mobile device may be a user equipment in a long term evolution-advanced system.

In another example, a computer program product for reporting power headroom from a mobile device may include a non-transitory computer-readable medium that may comprise: code for identifying a transmit power associated with each of a plurality of independently power controlled channels on which the mobile device is configured to transmit concurrently; code for accumulating the identified transmit powers; code for calculating a power headroom available for the mobile device using the accumulated transmit powers; and code for transmitting a headroom report comprising the calculated power headroom available for the mobile device.

In yet another example, a system for reporting power headroom from a mobile device, the system may comprise means for identifying a transmit power associated with each of a plurality of independently power controlled channels on which the mobile device is configured to transmit concurrently; means for accumulating the identified transmit powers; means for calculating a power headroom available for the mobile device using the accumulated transmit powers; and means for transmitting a headroom report comprising the calculated power headroom available for the mobile device.

For the system, a first channel may be an uplink control channel and a second channel may be an uplink shared channel. The identified transmit power of the first channel may be a virtual transmit power, and the identified transmit power of the second channel may be a determined transmit power for an actual transmission. The first channel may be a physical uplink control channel (PUCCH); the second channel may be a physical uplink shared channel (PUSCH); and the PUCCH and PUSCH may be transmitted concurrently on different carriers. The identified transmit power of one or more of the plurality of independently power controlled channels of the system may be a virtual transmit power. The virtual transmit power of the system may be determined by disregarding a variation associated with uplink control channel transmission in calculating the power headroom.

There may be means for determining transmit power during a first time period for a first independently power controlled channel to identify a first transmit power; and means for attributing a virtual transmit power to a second independently power controlled channel for the first time period to identify a second transmit power, wherein the mobile device does not transmit on the second independently power controlled channel during the first time period. Each of the plurality of independently power controlled channels of the system may be transmitted on a different carrier of a multi-carrier system. The plurality of independently power controlled channels of the system may be allocated to a single carrier.

In another example, a method of receiving a power headroom report from a mobile device comprises: receiving a headroom report including a power headroom available for uplink transmissions from a mobile device, the power headroom report identifying an accumulated transmit power associated with a plurality of independently power controlled channels on which the mobile device is configured to transmit concurrently; and scheduling an uplink allocation in relation to the plurality of independently power controlled channels as a group based on information obtained from the power headroom report.

A first channel may be an uplink control channel and a second channel may be an uplink shared channel. The identified transmit power of the first channel may be a virtual transmit power, and the identified transmit power of the second channel may be a determined transmit power for an actual transmission. The first channel may be a physical uplink control channel (PUCCH); the second channel may be a physical uplink shared channel (PUSCH); and the PUCCH and PUSCH may be transmitted concurrently on different carriers. The identified transmit power of one or more of the plurality of independently power controlled channels may be virtual transmit power. The virtual transmit power may be determined by disregarding a variation associated with uplink control channel transmission in calculating the power headroom. The identified transmit power of one or more of the plurality of independently power controlled channels may be virtual transmit power. The power headroom calculation module of the device may be further configured to determine the virtual transmit power by disregarding a variation associated with uplink control channel transmission in calculating the power headroom.

The scheduling may include scheduling an uplink allocation for a first channel comprising an uplink control channel; and scheduling an uplink allocation for a second channel comprising an uplink shared channel. The allocation for the second channel of the method may vary over time to account for whether the first channel has a scheduled allocation. Each of the plurality of independently power controlled channels of the method may be transmitted on a different uplink carrier of a multi-carrier system. The plurality of independently power controlled channels of the method may be allocated to a single uplink carrier.

In another example, a device for receiving a power headroom report from a mobile device may comprise: a receiver configured to receive a headroom report that may comprise a power headroom available for uplink transmissions from a mobile device, the power headroom report identifying an accumulated transmit power associated with a plurality of independently power controlled channels on which the mobile device may be configured to transmit concurrently; and an allocation module configured to schedule an uplink allocation in relation to the plurality of independently power controlled channels as a group based on information obtained from the power headroom report.

A first channel may be an uplink control channel and a second channel may be an uplink shared channel. The identified transmit power of the first channel may be a virtual transmit power, and the identified transmit power of the second channel may be a determined transmit power for an actual transmission. The virtual transmit power of the device may be determined by disregarding a variation associated with uplink control channel transmission in calculating the power headroom. Each of the plurality of independently power controlled channels of the device may be transmitted on a different uplink carrier of a multi-carrier system; or the plurality of independently power controlled channels of the device may be allocated to a single uplink carrier. The device may be a processor. The device may be an eNodeB in a long term evolution-advanced (LTE/A) system.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Systems, methods, devices, and computer program products are described for power headroom reporting. In some examples, a mobile device may identify a virtual transmit power associated uplink control channel, and an actual transmit power for one or more uplink shared channels. The virtual transmit power may be an uplink control channel offset, and be used when the uplink control channel is not transmitting. The identified transmit powers may be added up, and the power headroom available for the mobile device may be calculated using the summed transmit powers. The mobile device may transmit a power headroom report to a base station.

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

Figure 1:
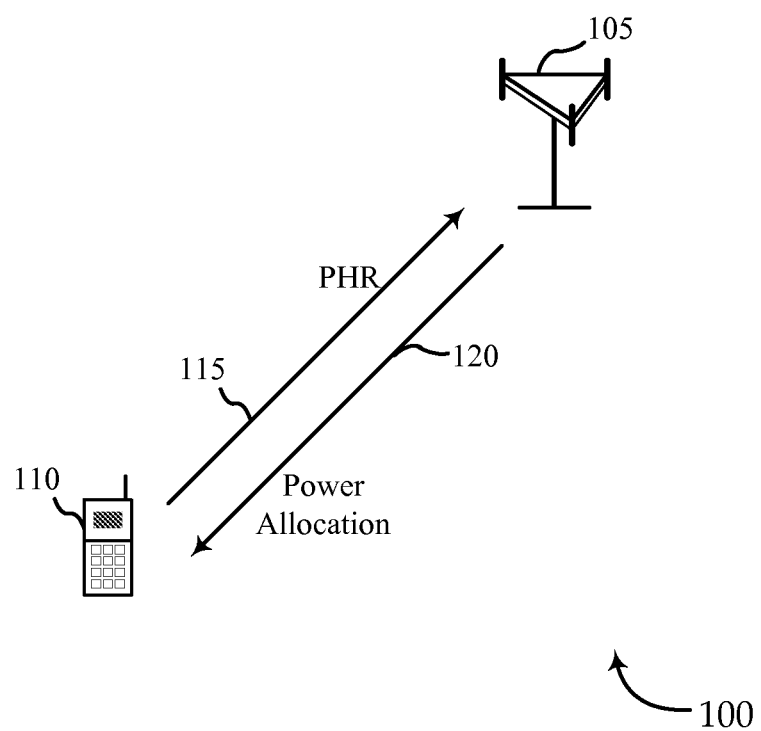
FIG. 1 is a block diagram of a wireless communication system.

Turning first to FIG. 1, a multiple access wireless communication system 100 according to one aspect of the present disclosure is illustrated. A base station 105 may include multiple antenna groups (not shown), and there may be multiple antennas in each antenna group. Each group of antennas and/or the area in which they are designed to communicate may be referred to as a sector. Antenna groups each may be designed to communicate with mobile devices 110 in a sector of the areas covered by the base station 105.

The base station 105 may be an eNode B in an LTE system, although aspects of the invention may be applicable to any number of other types of systems. A mobile device 110 is in communication with one of the antenna groups of base station 105. There may be multiple other mobile devices (not shown) in communications with the base station, as well. The base station 105 may transmit information over downlink 115 and receive information from a mobile device 110 over uplink 120. Each of the downlink 115 and uplink 110 may include a plurality of component carriers which have been configured for use by the mobile device 110. The mobile device 110 may be user equipment (UE) in an LTE/A system. The mobile device 110 may be a personal computer, laptop, tablet, personal digital assistant (PDA), thin client, smartphone, cellular telephone, or any other mobile computing device.

As shown, the mobile device 110 may transmit a power headroom report (PHR) to the base station 105. This report may include information identifying a difference between a maximum mobile device transmit power and a calculated mobile device transmit power (e.g., according to the current grant). PHRs can be transmitted periodically, or when the downlink pathloss changes in an amount exceeding a threshold and may relate to a physical uplink control channel (PUCCH), a physical uplink shared channel (PUSCH), or both channels. In response to receiving a PHR, the base station 105 can send up or down commands for either PUCCH or PUSCH.

The mobile device 110 may be configured to identify a transmit power associated with each of a number of independently power controlled uplink channels. The independently power controlled uplink channels may relate to concurrent transmissions on a single carrier and/or to transmissions on a plurality of uplink carriers configured for use by the mobile device 110. The mobile device 110 may add up the identified transmit powers for a given time period, and use this to calculate a power headroom available for the mobile device 110. A power headroom report (PHR) may be transmitted (e.g., in a single protocol data unit (PDU)) over the reverse link 115, and may include the calculated power headroom and/or an indication of the power headroom available for the mobile device 110.

In some examples, the independently power controlled uplink channels may include an uplink control channel, and one or more uplink shared channels. The identified transmit power of the control channel may be a virtual transmit power (e.g., a representation of transmit power which will be used in the event of a transmission when the control channel is not transmitting). This virtual transmit power may be an offset value and, in some scenarios, may be determined by disregarding contributions associated with various channels and/or transmission formats such as values of $\Delta\_TF$ used with an LTE communication system. The identified transmit power of the uplink shared channel may be a measured transmit power for an actual transmission. Each of the independently power controlled channels may be transmitted during a same time period on a different carrier of a multi-carrier system. However, in other examples, the independently power controlled channels may be transmitted concurrently on a single carrier.

In one set of examples, aspects may be used within a long term evolution-advanced (LTE/A) system. LTE/A may utilize orthogonal frequency division multiplexing (OFDM) on the downlink and single-carrier frequency division multiplexing (SC-FDMA) on the uplink. OFDM and SC-FDMA partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDMA. The spacing between adjacent subcarriers may be fixed, and the total number of subcarriers (K) may be dependent on the system bandwidth. For example, K may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.25, 2.5, 5, 10 or 20 MHz, respectively.

For the following set of LTE/A examples, the mobile device 110 will be referred to as a UE 110, and the base station 105 referred to as eNode B 105. Thus, the independently power controlled uplink channels may include a physical uplink control channel (PUCCH), and one or more physical uplink shared channels (PUSCH). In some examples, PUCCH and PUSCH may be transmitted concurrently. A UE 110 may be configured to make concurrent PUCCH and PUSCH transmissions, with different PUCCH and PUSCH transmissions on multiple carriers. A mobile device 110 may be configured for multi-carrier operation with PUCCHs transmitted on multiple uplink carriers.

A UE 110 may generate a PHR for multiple independently power controlled channels transmitted in parallel (e.g., the capability to transmit PUCCH and PUSCH concurrently in an LTE/A system, or to transmit on a plurality of PUSCHs corresponding to a plurality of carriers configured for use by the UE 110). As noted above, the multiple independently power controlled channels may include channels corresponding to a plurality of component carriers. However, in other examples, multiple independently power controlled channels may be transmitted on a single carrier for which the UE 110 transmits both PUCCH and PUSCH during a given time period.

A single PHR may carry information about both PUCCH and PUSCH for a set of carriers utilized by UE 110. The power headroom value may include a PUCCH contribution and a PUSCH contribution. The power headroom value in a PHR may include a single, 6 bit PDU, with a reporting range from −23 dB to 40 dB (and steps of 1 dB). In one example, when the PUCCH is inactive, a PUCCH contribution may be signaled in a PHR with a virtual transmit power (e.g., a standardized offset or an offset that ignores variations due to different transmit formats). In one example, these contributions may be signaled as a standardized ratio between PUSCH and PUCCH when PUCCH is inactive.

A UE 110 may transmit a PHR to the eNode B 105 when triggered by the eNode B 105, or periodically. A PHR may be generated for PUSCH transmissions at a time when there is no corresponding PUCCH transmission. In that case, notwithstanding that there are several PUCCH formats which could influence the PUCCH contribution, the differences may be ignored by assuming a particular format for a virtual PUCCH transmission. By way of example, there may a single MAC PDU, and a standardized ratio between PUCCH and PUSCH, or some other form of a standardized or fixed offset for PUCCH. This format may be implemented by setting $\Delta\_TF=0$ when no PUCCH transmission is made (which means that the different options for transmitting PUCCH are ignored, and instead a fixed offset may be assumed by the eNode B upon receipt of the PHR). The virtual transmit power may, therefore, be determined by disregarding a variation associated with uplink control channel transmission in calculating the power headroom. In addition, the virtual transmission concept may be extended to virtual PUSCH transmissions in the multi-carrier context. A PHR may be generated at a time when there is no PUSCH or PUCCH transmission, and in this case a virtual transmit power may be used for both PUSCH and PUCCH. In some examples, by using virtual transmission, the UE 110 may reduce the number of PHR bits that are transmitted when PUCCH is not transmitted. However, based on the ratio or offset, the eNode B 105 may infer a PUCCH contribution when scheduling.

Thus, a single PHR may provide the eNode B 105 with information on both PUCCH and PUSCH. The eNode B 105 may decompose the PHR into information about PUSCH and information about PUCCH. The eNode B 105 may use this information to influence future scheduling decisions. For example, the eNode B 105 may know that ACK/NAK is expected in a particular subframe (e.g., i+4). Given a power headroom reported for subframe (i), and the knowledge that the UE 110 will need to allocate more power for ACK/NAK, the eNode B 105 may change its uplink grants for subframe (i+4). For example, the eNode B 105 may vary a modulation and coding scheme (MCS) to use for uplink transmissions at subframe (i+4).

In one aspect, transmit power for certain channels (e.g., PUSCH) may be monitored during a first time period. Transmit power may be attributed to other channels (e.g., PUCCH) to identify a second transmit power (a virtual transmit power), even when the channels associated with the virtual transmit power are substantially unused for transmission during the first time period. A PHR may be a single PDU, which may contain a power headroom which accounts for transmit power associated with actual PUSCH transmission, and infers a transmit power for PUCCH (even though there in no PUCCH transmission for the relevant time period).

The eNode B 105 may receive the PHR for uplink transmissions from UE 110, and provide an uplink allocation for each of the independently power controlled channels based on information from the PHR. The uplink allocation for the channel associated with the virtual transmission may be varied over time to account for whether the channel associated with the virtual transmit power has a scheduled transmission.

Figure 2:
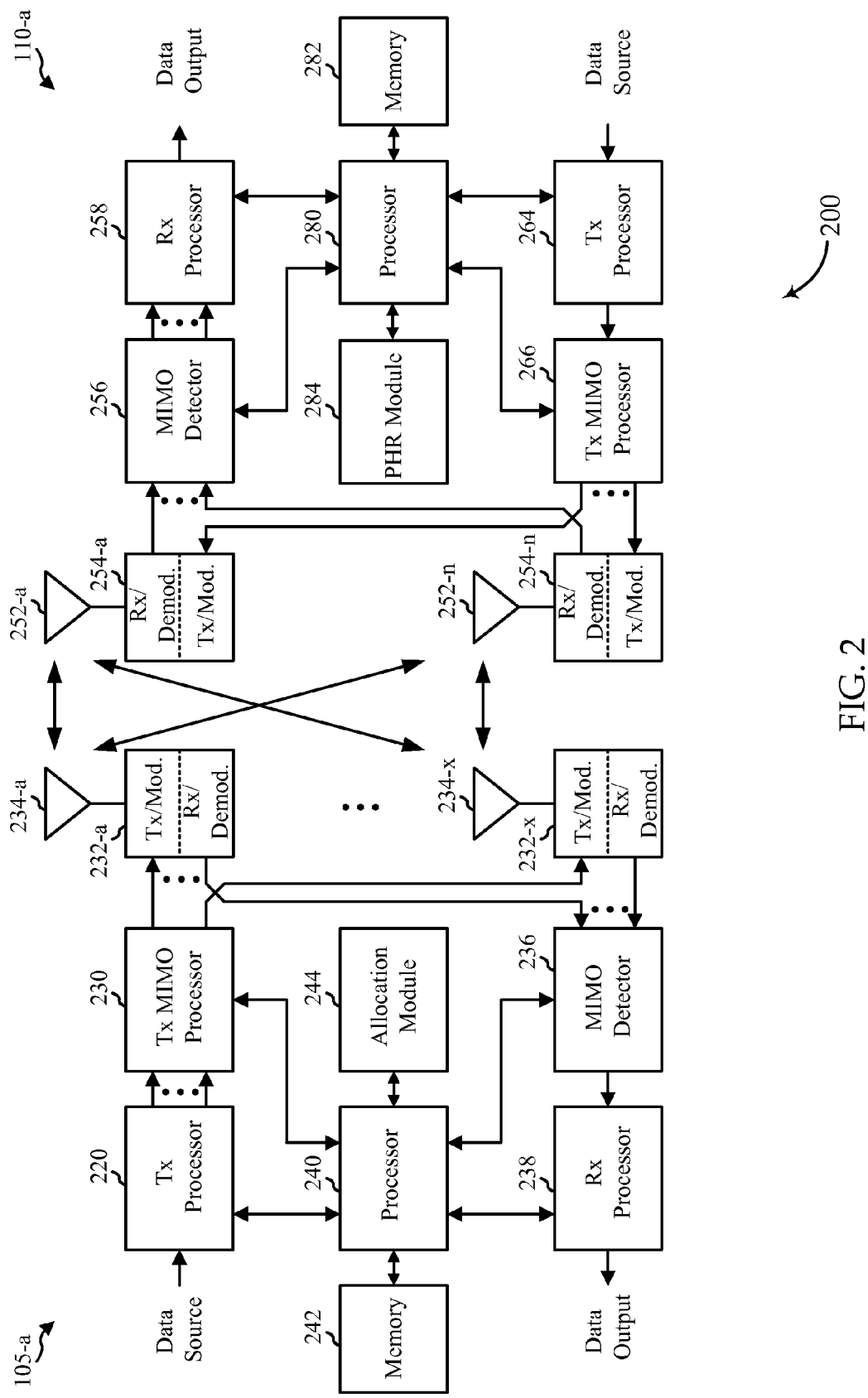
FIG. 2 is a block diagram of a transmitter and receiver in a multiple input multiple output (MIMO) system.

FIG. 2 is a block diagram of a system 200 including an eNode B 105-a and a UE 110-a. This system 200 may be the system 100 of FIG. 1. The eNode B 105-a may be equipped with antennas 234-a through 234-x, and the UE 110-a may be equipped with antennas 252-a through 252-n. At the eNode B 105-a, a transmit processor 220 may receive data from a data source and control information from a processor 240, memory 242, and/or allocation module 244. The control information may be a grant with power allocations for PUCCH and PUSCH, scheduling transmission on uplink carriers for a particular UE 110-a. The control information may also be for the physical control format indicator channel (PCFICH), physical HARQ indicator channel (PHICH), physical downlink control channel (PDCCH), physical downlink shared channel (PDSCH), etc.

The transmit processor 220 may process (e.g., encode and symbol map) the data and control information to obtain data symbols and control symbols, respectively. The transmit processor 220 may also generate reference symbols, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the transmit modulators 232-a through 232-x. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232-*a* through 232-*x* may be transmitted via the antennas 234-*a* through 234-*x*, respectively.

At the UE 110-*a*, the UE antennas 252-*a* through 252-*n* may receive the downlink signals from the eNode B 105-*a* and may provide the received signals to the demodulators 254-*a* through 254-*n*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254-*a* through 254-*n*, perform MIMO detection on the received symbols if applicable, and provide detected symbols. A receive processor 258 may process (e.g., demodulate, deinterleave, and decode) the detected symbols, providing decoded data for the UE 110-*a* to a data output, and provide decoded control information to a processor 280, memory 282, or PHR module 284 (e.g., the processing allocation information to identify carriers and timing to be used for PUSCH and PUCCH transmission on the uplink).

On the uplink, at the UE 110-*a*, a transmit processor 264 may receive and process data (e.g., for the PUSCH) from a data source and control information (e.g., for the PUCCH) from the processor 280 and PHR module 284. The transmit processor 264 may also generate reference symbols for a reference signal. The symbols from the transmit processor 264 may be precoded by a TX MIMO processor 266 if applicable, further processed by the demodulators 254-*a* through 254-*n* (e.g., for SC-FDMA, etc.), and be transmitted to the eNode B 105-*a*. At the eNode B 105-*a*, the uplink signals from the UE 110-*a* may be received by the antennas 234, processed by the demodulators 232, detected by a MIMO detector 236 if applicable, and further processed by a receive processor 238 to obtain decoded data and control information sent by the UE 110-*a*. The processor 238 may provide the decoded data to a data output and the decoded control information to the processor 240 and/or allocation module 244.

The PHR module 284 of UE 110-*a* may identify a virtual transmit power associated with an uplink control channel (e.g., PUCCH), and an actual transmit power for one or more uplink shared channels (e.g., PUSCH). The virtual transmit power may be an uplink control channel offset, and be used when the uplink control channel is not transmitting. The identified transmit powers (including the virtual transmit power) may be added together, and the power headroom available for the mobile device may be calculated using this information. The UE 110-*a* may transmit the PHR as control information to the eNode B 105-*a*.

It may be desirable in many instances for power headroom reporting to account for simultaneous transmission on multiple component carriers and independent power control on these component carriers. The present disclosure addresses issues with respect to power headroom reporting and the use of a virtual transmit power to account for PUCCH for a time period when no PUCCH transmissions are made.

Separate power headroom reports may be of value in many instances because power control operations on PUSCH and PUCCH can be run independently. However, a variety of reporting formats may be used to reduce overhead; for example, it is not necessary to always include separate PUSCH and PUCCH reports (where PUCCH power headroom is computed using a fixed offset relative to PUSCH). Even though several PUCCH formats are defined, a single PDU tied to one of them may be used such as by setting a format-specific offset like the $\Delta\_TF$ value used in LTE systems to zero or some other fixed value (e.g., when there are no PUCCH transmissions during a time period). A virtual transmit power, or other fixed power offset, may be used and configured by radio resource control (RRC) signaling. A single MAC PDU may be defined for use in certain circumstances, providing for a virtual PUCCH transmit power or fixed PUCCH/PUSCH power ratio which may reduce overhead (as opposed to a separate PHR for each, or a PUSCH only PHR).

Figure 3:
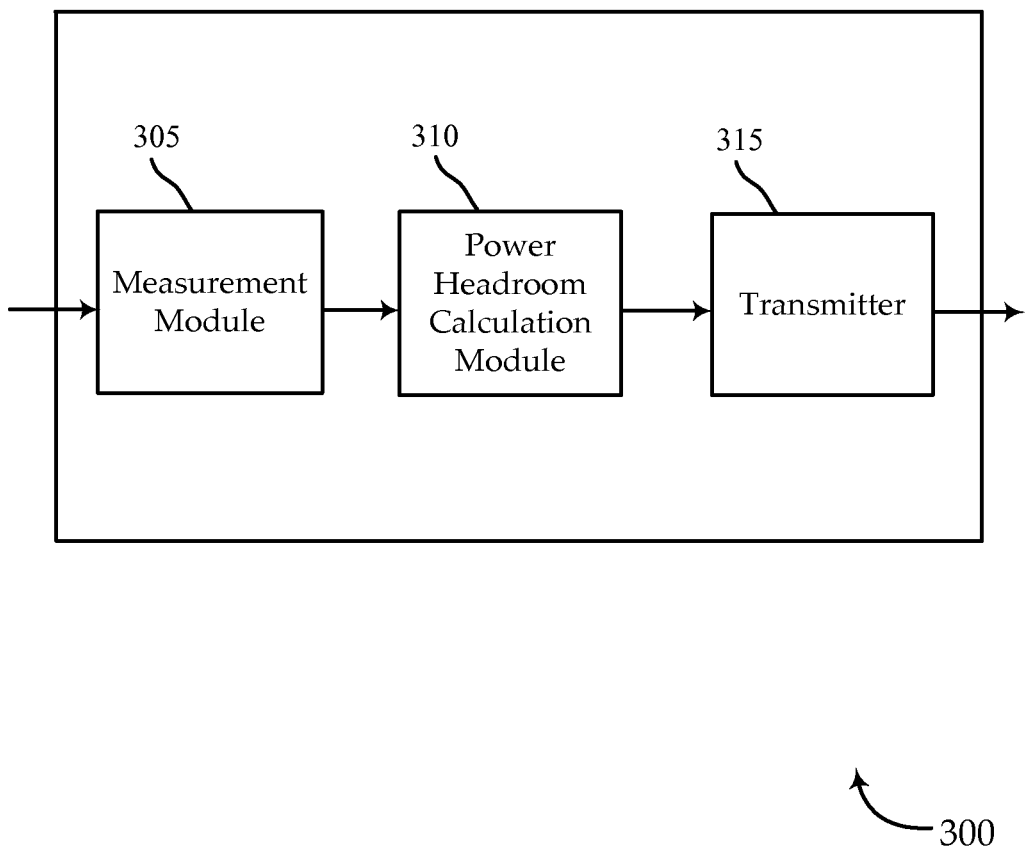
FIG. 3 is a block diagram of a power headroom report module.

Turning next to FIG. 3, a simplified block diagram shows a PHR module 300. The PHR module 300 includes a measurement module 305, power headroom calculation module 310, and transmitter 315. The PHR module 300 may be the PHR module 284 of FIG. 2. It may be integrated into the mobile device 110 of FIG. 1 or 2.

The components of the PHR module 300 may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The measurement module 305 may be configured to identify a transmit power associated with each of a number of independently power controlled channels of a mobile device. For example, the measurement module 305 may identify transmit power with reference to a power amplifier gain or other indication of transmit power for each independently power controlled channel. In one aspect, one channel may be an uplink control channel, and one or more additional channels that are uplink shared channels. The independently power controlled channels may be related to a single carrier or a plurality of carriers. The identified transmit power of one channel (e.g., the uplink control channel) may be a virtual transmit power, while other identified transmit powers may be measured transmit powers for actual transmissions.

The power headroom calculation module 310 may be configured to accumulate the identified transmit powers (including the virtual transmit power), and calculate a power headroom available for the mobile device using the accumulated transmit powers. The transmitter 315 may be configured to transmit a headroom report including the calculated power headroom available for the mobile device.

Figure 4A:
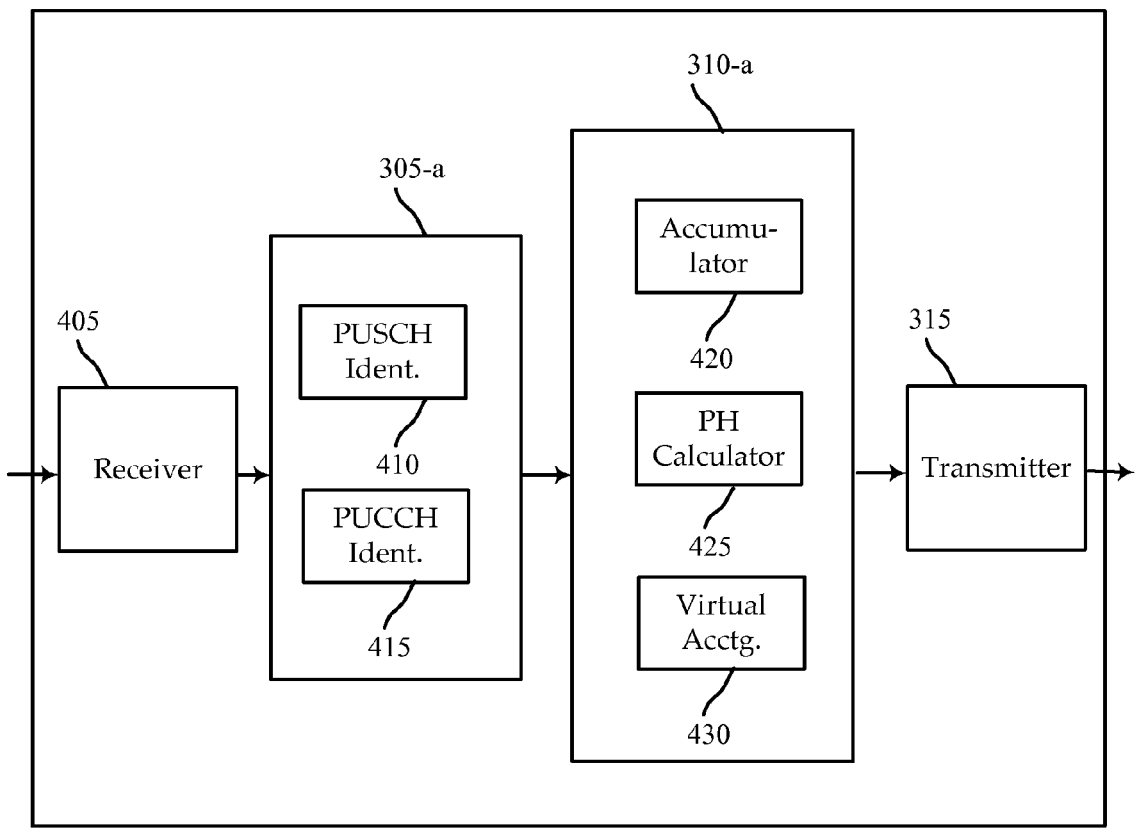
FIG. 4A is a block diagram of an alternative architecture for a power headroom report device.

FIG. 4A is a block diagram of an alternative architecture for PHR device 400. The PHR device 400 includes a receiver 405, a measurement module 305-*a*, power headroom calculation module 310-*a*, and transmitter 315. The measurement module 305-*a* includes a PUSCH identification sub-module 410 and a PUCCH identification sub-module 415. The power headroom calculation module 310-*a* includes an accumulator sub-module 420, power headroom (PH) calculator sub-module 425, and virtual accounting sub-module 430. The PHR device 400 may be an example of the PHR module 300 of FIG. 3, or the PHR module 284 of FIG. 2. The PHR device 400 may be mobile device 110 of FIG. 1 or 2, or may be a component thereof. For purposes of explanation the PHR device will be described with reference to LTE/A, while noting that principles described herein may be applied to a number of systems.

The receiver 405 may be configured to receive power control data and various scheduling information for PUSCH and PUCCH on one or multiple carriers, and forward this data to the measurement module 305-a and/or the power headroom calculation module 310-a. At the measurement module 305-a, the PUSCH identification sub-module 410 may determine a transmit power and carriers associated with PUSCH transmissions during a time period. The PUCCH identification sub-module 415 may measure and/or identify a transmit power and carrier associated with PUCCH transmissions during the same time period.

The measurements and/or identifications may be forwarded to the power headroom calculation module 310-a. Assume that there is no PUCCH transmission during a time period. The virtual accounting sub-module 430 may associate a virtual transmit power with the PUCCH. Thus, there may be a standard power offset used to account for PUCCH when there is no PUCCH transmission during a time period. The accumulator sub-module 420 may add the virtual transmit power to the actual transmit powers for each of the PUSCH transmissions (e.g., for each of the uplink PUSCH carriers) for the time period. The power headroom calculator sub-module 425 may use the calculations from the accumulator to determine the power headroom available for the mobile device (by, for example, comparing a maximum transmit power at the mobile device with the estimated transmit power (including the virtual transmit power). The power headroom calculator sub-module 425 may then put together a PHR identifying the headroom available. The transmitter 315 may transmit the PHR to an base station (e.g., eNode B 105-a of FIG. 2).

Figure 4B:
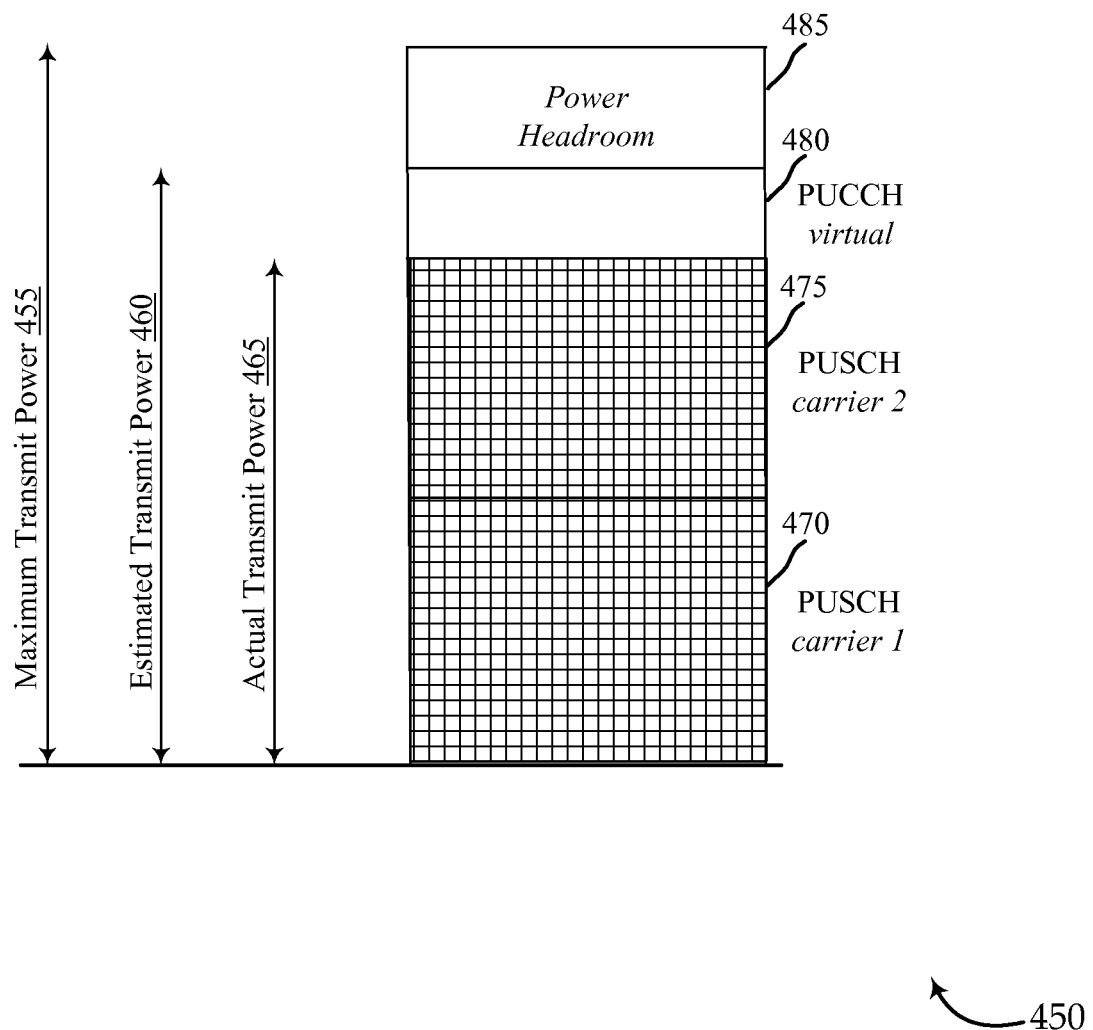
FIG. 4B is a bar graph illustrating an example power headroom calculation.

Turning briefly to FIG. 4B, a bar graph 450 is shown illustrating information that may be contained in a PHR at a UE (e.g., the UE 110-a of FIG. 2) for a given time period. Assume that there is a maximum transmit power 455 associated with a UE. The transmit power used for PUSCH transmissions on carrier 1 (470) along with the transmit power used for PUSCH transmissions on carrier 2 (475) are used to illustrate an actual transmit power 465 from a UE but could include any number of independently power controlled channels on any number of uplink carriers. Also assume that there is no transmission during the time period on PUCCH. In that case, a virtual transmit power 480 may be associated with PUCCH, and may be used to provide an estimated transmit power 460 for purposes of calculating power headroom 485.

Figure 5:
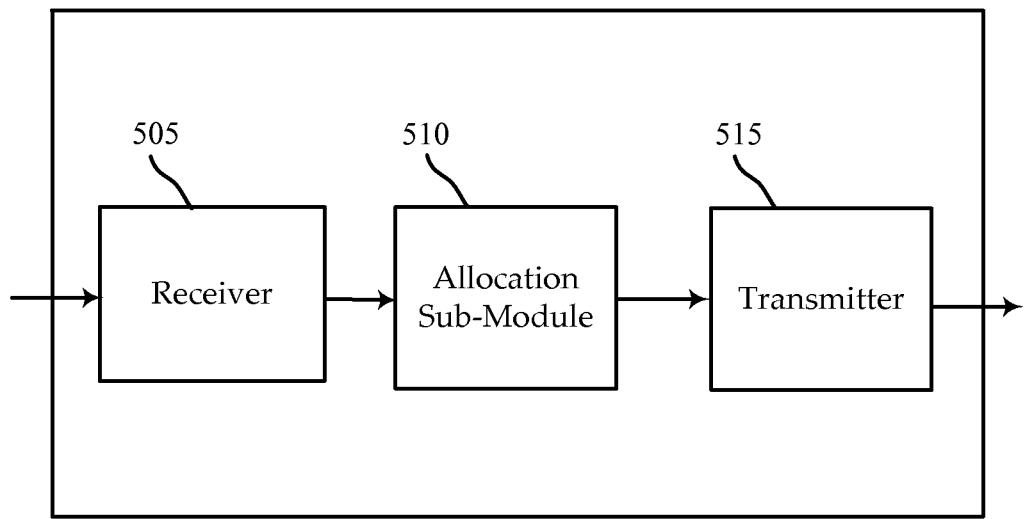
FIG. 5 is a block diagram of a scheduler.

Turning next to FIG. 5, a block diagram illustrates an allocation subsystem 500. This allocation subsystem 500 may be allocation module 244 of FIG. 2, or integrated into the base station of FIG. 1 or 2. The allocation subsystem 500 includes a receiver 505, allocation sub-module 510, and transmitter 515. The allocation sub-module 510 may allocate resources on PUCCH and PUSCH. PUCCH resources may be allocated in a semi-static manner. As one example, the mobile device may be configured by higher layer messages for periodic CQI (channel quality information) reporting on PUCCH. The allocation sub-module 510 may also dynamically allocate PUSCH resources.

Decisions of the allocation sub-module 510 may be influenced by information obtained from the power headroom reports. In one aspect, the receiver 505 may receive a power headroom report (PHR) identifying a power headroom available for uplink transmissions from a mobile device. The PHR may identify an accumulated transmit power associated with each of a number of independently power controlled channels. One or more of the transmit powers may be a virtual transmit power. This may be the PHR transmitted from the mobile device 110 to the base station 105 in FIG. 1 or 2, the PHR generated by the PHR module 300 of FIG. 3, or the PHR device 400 of FIG. 4.

The allocation sub-module 510 may identify the transmit power (or virtual transmit power) associated with PUCCH using the PHR (and perhaps additional information), and may assess the power headroom available. The allocation sub-module 510 may likewise identify the transmit power associated with PUSCH (on each of a number of channels) using the PHR (and perhaps additional information), and may assess the power headroom available. The PHR may be single MAC PDU in some examples.

The allocation sub-module 510 may identify the grant and carrier to be used for PUCCH based on information from the PHR and determine an uplink allocation for each of the of independently power controlled channels (e.g., for the PUCCH and each PUSCH) taking into account information obtained from the PHR. The transmitter 515 may then forward this scheduled allocation to the mobile device 110 of FIG. 1 or 2, the PHR module 300 of FIG. 3, or the PHR device 400 of FIG. 4. As new PHRs are received, the allocation sub-module 510 may modify and update the grants.

Figure 6:
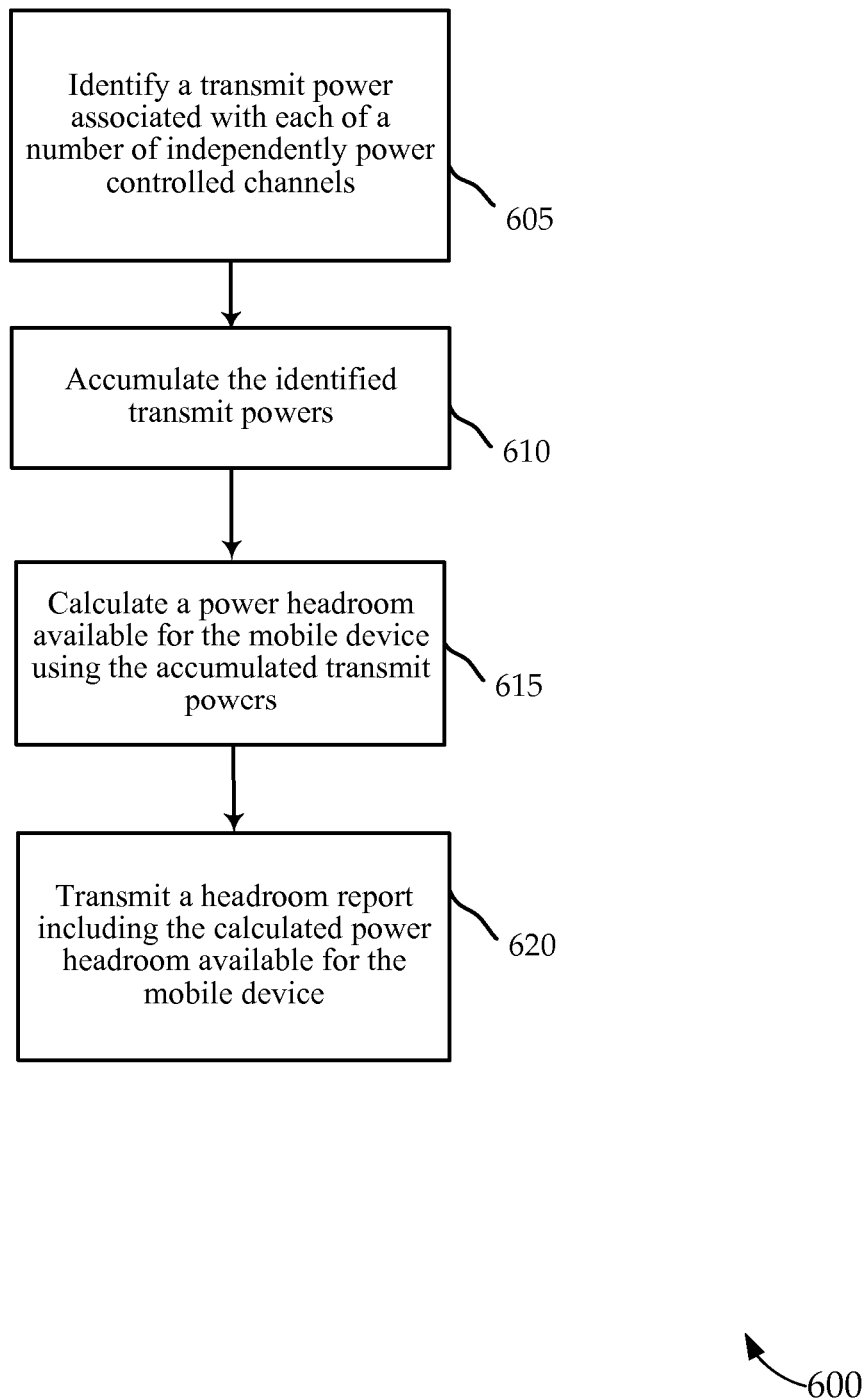
FIG. 6 is a flowchart of a method for power headroom calculation from a mobile device.

FIG. 6 is a flow chart of a method 600 of power headroom calculation from a mobile device. The method may be performed, in whole or in part, by the mobile device 110 of FIG. 1 or 2, the PHR module 284 of FIG. 2, the PHR module 300 of FIG. 3, or the PHR device 400 of FIG. 4.

At block 605, a transmit power associated with each of a number of independently power controlled channels is identified. The independently power controlled channels may be associated with one or multiple uplink carriers configured for use by the mobile device. The mobile device may be configured to concurrently transmit on one or more of the independently power controlled channels. At block 610, the identified transmit powers are accumulated. At block 615, a power headroom available for the mobile device is calculated using the accumulated transmit powers. In some aspects, a PHR value may be expressed as an offset relative to a reference power and may include contributions which are dependent upon a specific transport format. As described herein, a virtual transmit power may be used to represent one or of the independently power controlled channels and may be determined by disregarding the transport format contribution. At block 620, a headroom report including the available power headroom calculations is transmitted.

Figure 7:
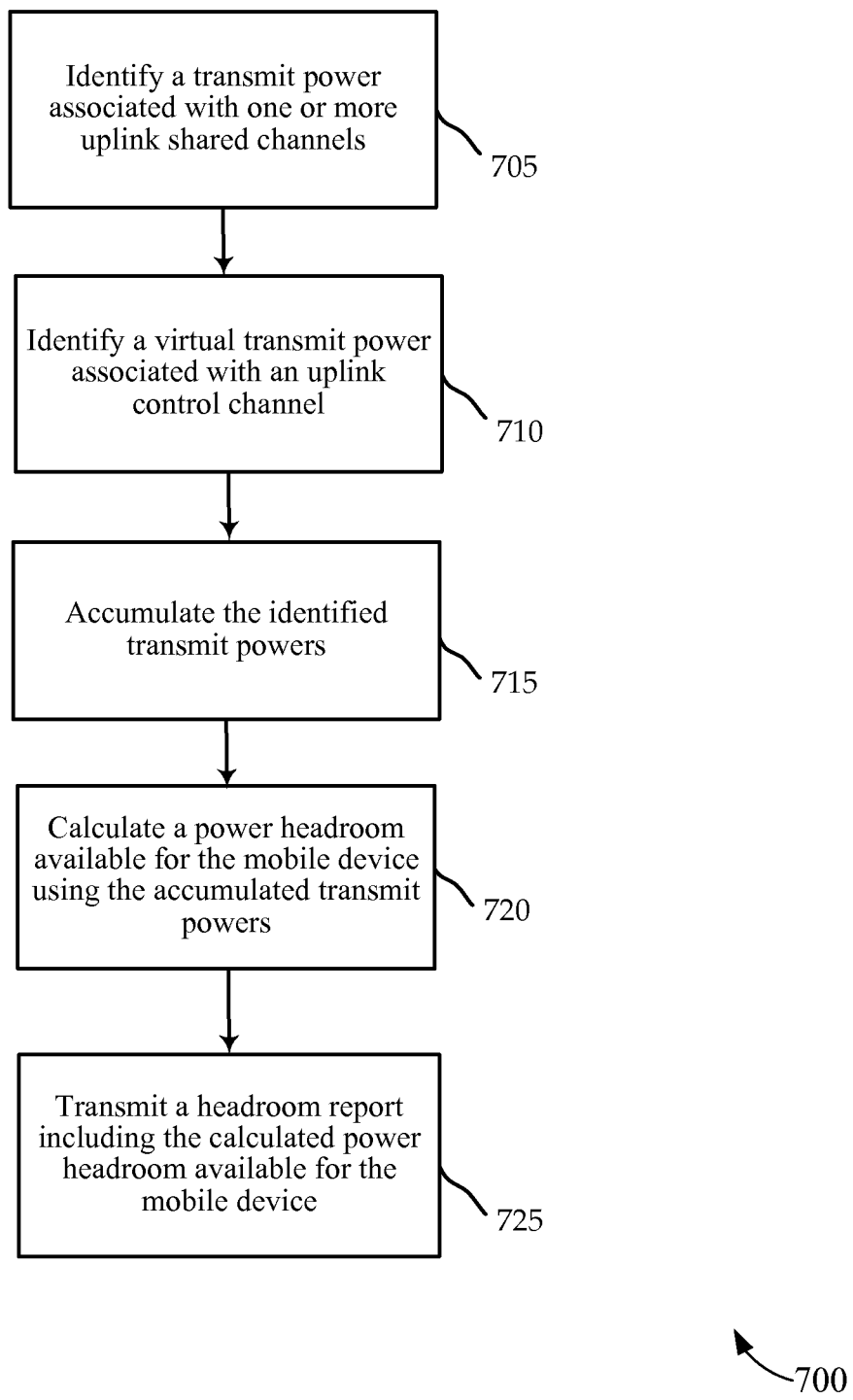
FIG. 7 is a flowchart of a method for power headroom calculation for uplink shared and control channels from a mobile device.

FIG. 7 is a flow chart of a method 700 of power headroom calculation from a mobile device for uplink shared and control channels. This method 700 may be an example of the method 600 of FIG. 6. The method 700 may be performed, in whole or in part, by the mobile device 110 of FIG. 1 or 2, the PHR module 284 of FIG. 2, the PHR module 300 of FIG. 3, or the PHR device 400 of FIG. 4.

At block 705, a transmit power associated with one or more uplink shared channels of one or more carriers is identified. At block 710, a virtual transmit power associated with an uplink control channel is identified. At block 715, the identified transmit powers are accumulated. At block 720, a power headroom available for the mobile device is calculated using the accumulated transmit powers. At block 725, a headroom report is transmitted including the calculated power headroom available for the mobile device.

Figure 8:
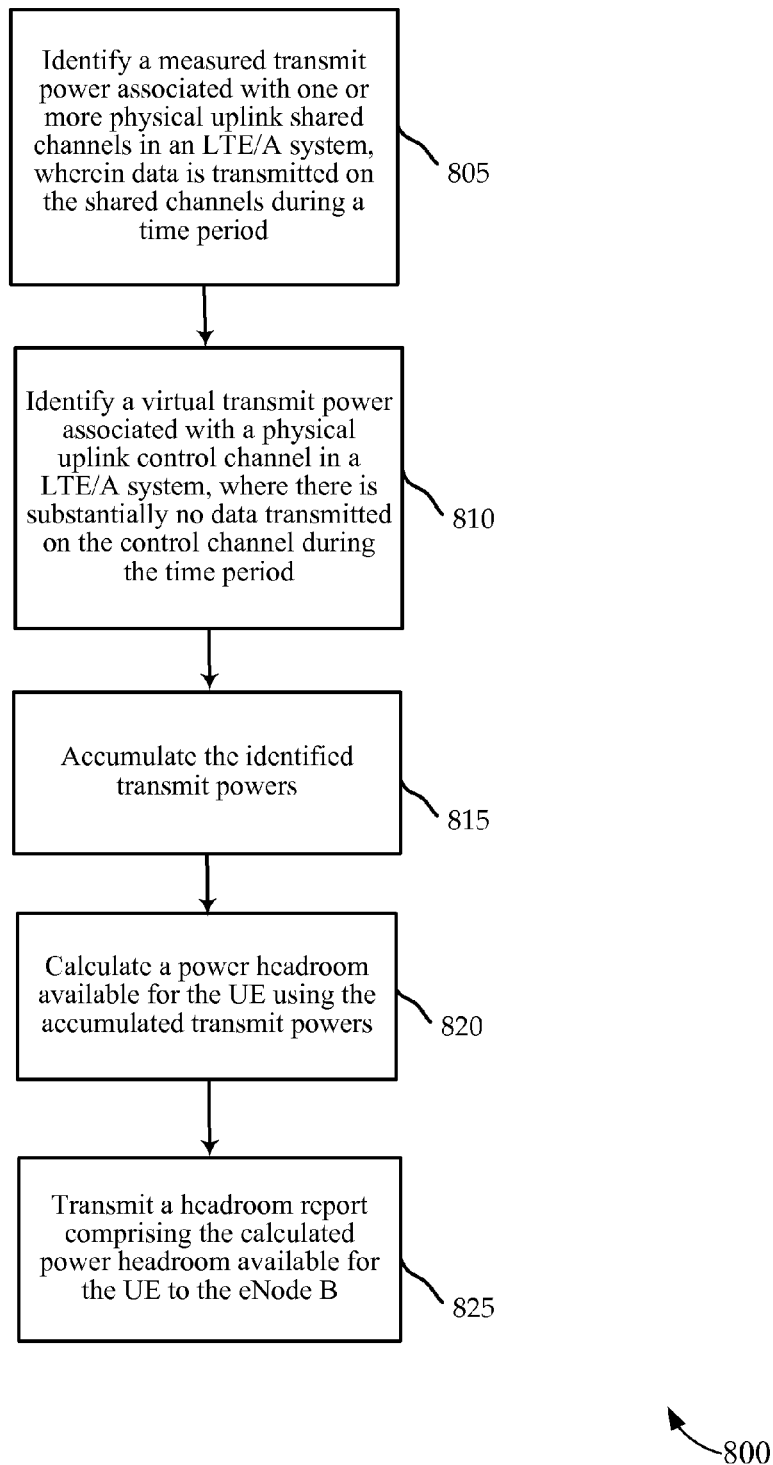
FIG. 8 is a flowchart of a method for power headroom calculation for uplink shared and control channels in an LTE system.

FIG. 8 is a flow chart of a method 800 of power headroom calculation from a mobile device for uplink shared and control channels on one or more carriers in an LTE system. This method 800 may be an example of the method 600 of FIG. 6.

The method 800 may be performed, in whole or in part, by the mobile device 110 of FIG. 1 or 2, the PHR module 284 of FIG. 2, the PHR module 300 of FIG. 3, or the PHR device 400 of FIG. 4.

At block 805, a measured transmit power associated with one or more physical uplink shared channels on one or more carriers in an LTE/A system is identified, wherein there are shared channel transmission during a time period. The LTE/A system, for example, may support multi-carrier operation in which a UE receives grants on a plurality of PUSCHs and/or in which the UE is permitted to transmit simultaneously on PUSCH and PUCCH. At block 810, a virtual transmit power associated with a physical uplink control channel in an LTE/A system is identified, wherein there is substantially no data transmitted on the control channel during the time period. At block 815, the identified transmit powers are accumulated (including the virtual transmit power). At block 820, a power headroom available for the UE is calculated using the accumulated transmit powers. At block 825, a headroom report is transmitted including the calculated power headroom available for the mobile device.

Figure 9:
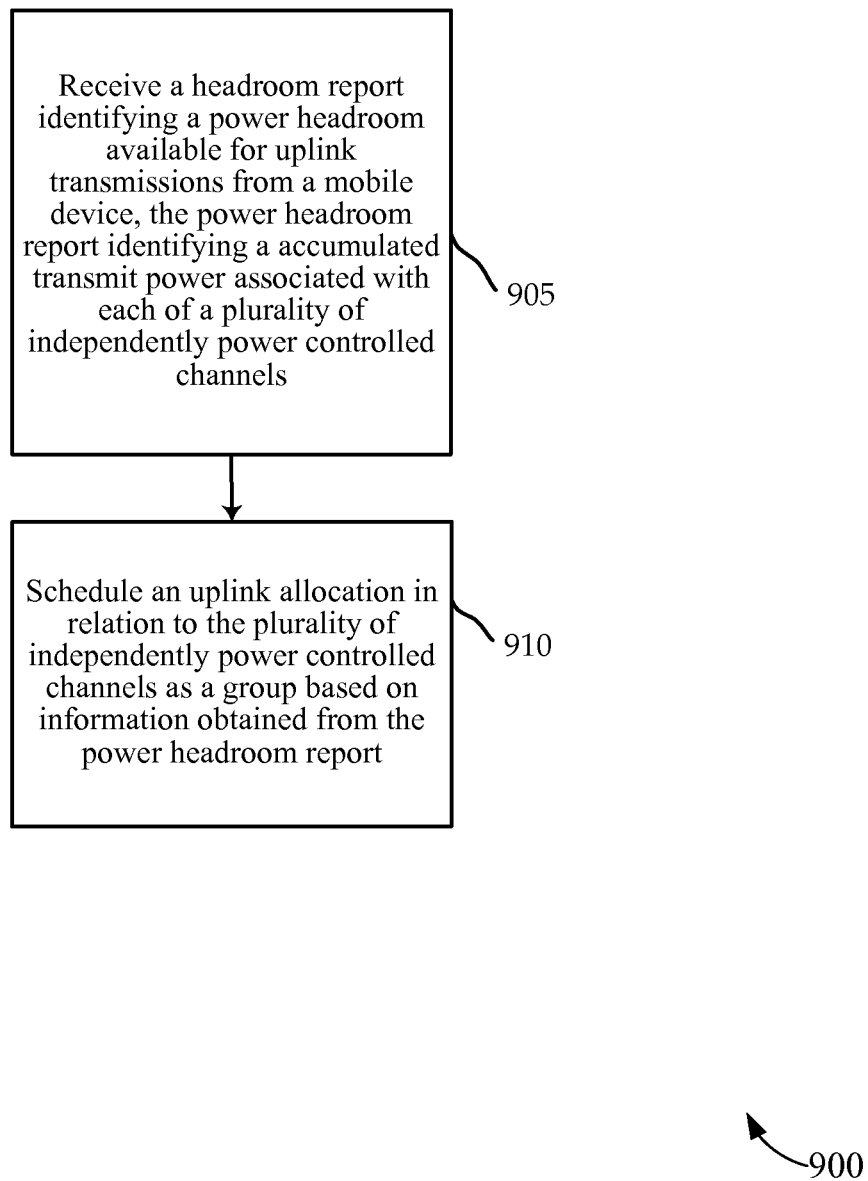
FIG. 9 is a flowchart of a method for scheduling one or more grants.

FIG. 9 is a flow chart of a method 900 for scheduling one or more uplink grants. This method 900 may be performed, in whole or in part, by the base station of FIG. 1 or 2, the allocation module 244 of FIG. 2, or the allocation subsystem 500 of FIG. 5.

At block 905, a headroom report identifying a power headroom available for uplink transmissions is received from a mobile device. The power headroom report may identify an accumulated transmit power associated with each of a number of independently power controlled channels. One or more of the transmit powers may be a virtual transmit power. At block 910, one or more uplink allocations are scheduled or otherwise allocated for transmission in relation to the independently power controlled channels as a group based on information obtained from the power headroom report.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

It is understood that the specific order or hierarchy of steps in the processes disclosed is merely an example. Based upon design preferences, it is understood that the specific order or hierarchy of steps in the processes may be rearranged while remaining within the scope of the present disclosure. The accompanying method claims present elements of the various steps in an order, but are not intended to be limited to the disclosed order.

The detailed description set forth above in connection with the appended drawings describes examples and does not represent the only embodiments that may be implemented or that are within the scope of the claims. The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer-readable medium such as a storage medium. Processors may perform the necessary tasks. The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Throughout this disclosure the term "example" or "exemplary" indicates an example or instance and does not imply or require any preference for the noted example. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), then the coaxial cable, fiber optic cable, twisted pair, DSL are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not to be limited to the examples and designs described herein but is to be accorded the widest scope consistent with the principles and novel features disclosed herein.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method of reporting power headroom from a mobile device, the method comprising:
   identifying a transmit power associated with each of a plurality of independently power controlled channels on which the mobile device is configured to transmit concurrently, the identifying a transmit power including:
   determining transmit power during a given time period for a first independently power controlled channel to identify a first transmit power, if the mobile device is transmitting on the first independently power controlled channel during the given time period; and
   attributing a transmission-format-independent transmit power to a second independently power controlled channel, if the mobile device does not transmit on the second independently power controlled channel during the given time period, wherein the transmission-format-independent transmit power is a non-zero value that corresponds to a representation of transmit power for a channel, and which is attributed to the channel when the channel is not being transmitted by the mobile device; and
   transmitting a headroom report based on the identified transmit powers for the mobile device.

2. The method of claim 1, wherein the plurality of independently power controlled channels comprise:
   a first channel comprising an uplink shared channel; and
   a second channel comprising an uplink control channel.

3. The method of claim 2, wherein,
   the second channel comprises a physical uplink control channel (PUCCH);
   the first channel comprises a physical uplink shared channel (PUSCH); and
   the PUCCH and PUSCH are transmitted concurrently on different carriers.

4. The method of claim 1, wherein the transmission-format-independent virtual transmit power comprises a fixed predetermined value.

5. The method of claim 1, further comprising:
   determining the transmission-format-independent transmit power by disregarding a variation associated with uplink control channel transmission in calculating the power headroom.

6. The method of claim 1, wherein each of the plurality of independently power controlled channels is transmitted on a different carrier of a multi-carrier system.

7. The method of claim 1, wherein the plurality of independently power controlled channels is allocated to a single carrier.

8. A device for reporting power headroom, the device comprising:
   a measurement module configured to identify a transmit power associated with each of a plurality of independently power controlled channels on which a mobile device is configured to transmit concurrently, wherein the measurement module is configured to identify a transmit power by performing operations including:
   determining transmit power during a given time period for a first independently power controlled channel to identify a first transmit power, if the mobile device is transmitting on the first independently power controlled channel during the given time period; and
   attributing a transmission-format-independent transmit power to a second independently power controlled channel, if the mobile device does not transmit on the second independently power controlled channel during the given time period, wherein the transmission-format-independent transmit power is a non-zero value that corresponds to a representation of transmit power for a channel, and which is attributed to the channel when the channel is not being transmitted by the mobile device; and
   a transmitter configured to transmit a headroom report based on the identified transmit powers for the mobile device.

9. The device of claim 8, wherein the plurality of independently power controlled channels comprise:
   a first channel comprising an uplink shared channel; and
   a second channel comprising an uplink control channel.

10. The device of claim 9, wherein,
    the second channel comprises a physical uplink control channel (PUCCH);
    the first channel comprises a physical uplink shared channel (PUSCH); and
    the PUCCH and PUSCH are transmitted concurrently on different carriers.

11. The device of claim 8, wherein the transmission-format-independent transmit power comprises a fixed predetermined value.

12. The device of claim 8, wherein the power headroom calculation module is further configured to determine the transmission-format-independent transmit power by disregarding a variation associated with uplink control channel transmission in calculating the power headroom.

13. The device of claim 8, wherein each of the plurality of independently power controlled channels is transmitted on a different uplink carrier of a multi-carrier system.

14. The device of claim 8, wherein the plurality of independently power controlled channels is allocated to a single uplink carrier.

15. The device of claim 8, wherein the device comprises a processor.

16. The device of claim 8, wherein the device comprises the mobile device.

17. The device of claim 16, wherein the mobile device comprises a user equipment in a long term evolution-advanced system.

18. A computer program product for reporting power headroom from a mobile device, the computer program product comprising:
a non-transitory computer-readable medium comprising:
code for identifying a transmit power associated with each of a plurality of independently power controlled channels on which the mobile device is configured to transmit concurrently, the identifying a transmit power including:
determining transmit power during a given time period for a first independently power controlled channel to identify a first transmit power, if the mobile device is transmitting on the first independently power controlled channel during the given time period; and
attributing a transmission-format-independent transmit power to a second independently power controlled channel, if the mobile device does not transmit on the second independently power controlled channel during the given time period, wherein the transmission-format-independent transmit power is a non-zero value that corresponds to a representation of transmit power for a channel, and which is attributed to the channel when the channel is not being transmitted by the mobile device; and
code for transmitting a headroom report based on the identified transmit powers for the mobile device.

19. A wireless communications device, comprising:
means for identifying a transmit power associated with each of a plurality of independently power controlled channels on which the mobile device is configured to transmit concurrently, the means for identifying a transmit power including:
means for determining transmit power during a given time period for a first independently power controlled channel to identify a first transmit power, if the wireless communication device is transmitting on the first independently power controlled channel during the given time period; and
means for attributing a transmission-format-independent transmit power to a second independently power controlled channel, if the mobile device does not transmit on the second independently power controlled channel during the given time period, wherein the transmission-format-independent transmit power is a non-zero value that corresponds to a representation of transmit power for a channel, and which is attributed to the channel when the channel is not being transmitted by the wireless communication device; and
means for transmitting a headroom report based on the identified transmit powers for the mobile device.

20. The wireless communications device of claim 19, wherein the plurality of independently power controlled channels comprise:
a first channel comprising an uplink shared channel; and
a second channel comprising an uplink control channel.

21. The wireless communications device of claim 20, wherein,
the second channel comprises a physical uplink control channel (PUCCH);
the first channel comprises a physical uplink shared channel (PUSCH); and
the PUCCH and PUSCH are transmitted concurrently on different carriers.

22. The wireless communications device of claim 19, wherein the transmission-format-independent transmit power comprises a fixed predetermined value.

23. The wireless communication device of claim 19, wherein the transmission-format-independent transmit power is determined by disregarding a variation associated with uplink control channel transmission in calculating the power headroom.

24. The wireless communications device of claim 19, wherein each of the plurality of independently power controlled channels is transmitted on a different carrier of a multi-carrier system.

25. The wireless communications device of claim 19, wherein the plurality of independently power controlled channels is allocated to a single carrier.

26. A method of receiving a power headroom report from a mobile device, the method comprising:
receiving a headroom report reflecting a power headroom available for uplink transmissions from a mobile device, the power headroom report based on identified transmit powers associated with a plurality of independently power controlled channels on which the mobile device is configured to transmit concurrently, the identified transmit powers including:
a first transmit power determined during a given time period for a first independently power controlled channel, if the mobile device is transmitting on the first independently power controlled channel during the given time period; and
a transmission-format-independent transmit power attributed to a second independently power controlled channel, if the mobile device does not transmit on the second independently power controlled channel during the given time period, wherein the transmission-format-independent transmit power is a non-zero value that corresponds to a representation of transmit power for a channel, and which is attributed to the channel when the channel is not being transmitted by the mobile device; and
scheduling an uplink allocation in relation to the plurality of independently power controlled channels as a group based on information obtained from the power headroom report.

27. The method of claim 26, wherein the plurality of independently power controlled channels comprise:
a first channel comprising an uplink shared channel; and
a second channel comprising an uplink control channel.

28. The method of claim 27, wherein,
the second channel comprises a physical uplink control channel (PUCCH);
the first channel comprises a physical uplink shared channel (PUSCH); and the PUCCH and PUSCH are transmitted concurrently on different carriers.

29. The method of claim 28, wherein the transmission-format-independent transmit power comprises a fixed predetermined value.

30. The method of claim 26, wherein the transmission-format-independent transmit power is determined by disregarding a variation associated with uplink control channel transmission in calculating the power headroom.

31. The method of claim 26, wherein scheduling an uplink allocation for transmission of each of the plurality of independently power controlled channels comprises:
   scheduling an uplink allocation for a first channel comprising an uplink control channel; and
   scheduling an uplink allocation for a second channel comprising an uplink shared channel.

32. The method of claim 31, wherein the uplink allocation for the second channel varies over time to account for whether the first channel has a scheduled allocation.

33. The method of claim 26, wherein each of the plurality of independently power controlled channels is transmitted on a different uplink carrier of a multi-carrier system.

34. The method of claim 26, wherein the plurality of independently power controlled channels is allocated to a single uplink carrier.

35. A device for receiving a power headroom report from a mobile device, the device comprising:
   a receiver configured to receive a headroom report reflecting a power headroom available for uplink transmissions from a mobile device, the power headroom report based on identified transmit powers associated with a plurality of independently power controlled channels on which the mobile device is configured to transmit concurrently, the identified transmit powers including:
      a first transmit power determined during a given time period for a first independently power controlled channel, if the mobile device is transmitting on the first independently power controlled channel during the given time period; and
      a transmission-format-independent transmit power attributed to a second independently power controlled channel, if the mobile device does not transmit on the second independently power controlled channel during the given time period, wherein the transmission-format-independent transmit power is a non-zero value that corresponds to a representation of transmit power for a channel, and which is attributed to the channel when the channel is not being transmitted by the mobile device; and
   an allocation module configured to schedule an uplink allocation in relation to the plurality of independently power controlled channels as a group based on information obtained from the power headroom report.

36. The device of claim 35, wherein the plurality of independently power controlled channels comprise:
   a first channel comprising an uplink shared channel; and
   a second channel comprising an uplink control channel.

37. The device of claim 35, wherein the transmission-format-independent transmit power is determined by disregarding a variation associated with uplink control channel transmission in calculating the power headroom.

38. The device of claim 35, wherein,
   each of the plurality of independently power controlled channels is transmitted on a different uplink carrier of a multi-carrier system; or
   the plurality of independently power controlled channels is allocated to a single uplink carrier.

39. The device of claim 35, wherein the device comprises a processor.

40. The device of claim 35, wherein the device comprises an eNodeB in a long term evolution-advanced (LTE/A) system.

* * * * *